2,905,701
2-BENZOFURFURYL ISOTHIOCYANATE

Lee Nutting, Berkeley, and Robert M. Silverstein and Chester M. Himel, Menlo Park, Calif., assignors to Hills Bros. Coffee, Inc., San Francisco, Calif., a corporation of California No Drawing. Application July 29, 1955
Serial No. 525,355

1 Claim. (Cl. 260—346.2)

This invention relates to organic compounds and has particular reference to new organic isothiocyanates and their preparation.

This invention has as an object the preparation of new organic compounds. A further object is the preparation of a new class of organic isothiocyanates. Yet another object of this invention is the preparation of a new class of compounds, consisting of heterocyclic isothiocyanates.

Other objects and advantages of this invention it is believed will be readily apparent from the following detailed description of preferred embodiments thereof.

These and other objects are accomplished by the following invention wherein heterocyclic amines are reacted with thiophosgene, or carbon disulfide and alkali followed by decomposition with a heavy metal salt or with ethyl chloroformate, the resulting reaction products being new compounds generically defined as heterocyclic compounds having on a nuclear carbon atom a substituent of the general formula —RNCS, wherein R is an alkylene radical.

The invention is illustrated by the following examples:

EXAMPLE 1

*2-furfuryl isothiocyanate*

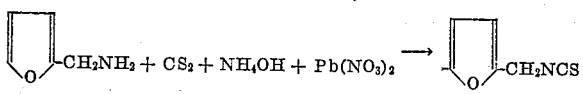

To a mixture of 9.12 g. of carbon disulfide and 15.5 ml. of 28% ammonium hydroxide cooled in an ice bath, was added portionwise with stirring 10.0 g. of furfurylamine. After 15 minutes of additional stirring in the ice bath, 137 ml. of water and 34.4 g. of lead nitrate in 70 ml. of water were added. The mixture was steam distilled, and the distillate was extracted with ether. The residue from the ether solution was distilled at 1 mm. at a head temperature of 43–48° C. The distillate gave the following analytical values:

|           | Calculated, Percent | Found, Percent |
|-----------|--------------------:|---------------:|
| Carbon    | 51.8                | 51.8           |
| Hydrogen  | 3.60                | 3.70           |

EXAMPLE 2

*2-benzofurfuryl isothiocyanate*

(a)
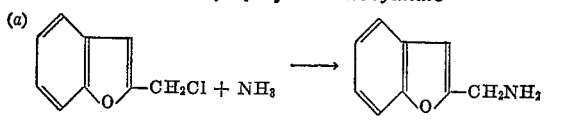

(b)

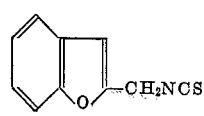

*a.* To 3.0 g. of benzofurfuryl chloride was added 300 ml. of a saturated solution of ammonia in ethanol. After 5 days, the solution was evaporated, and the residue was distilled at 2 mm. at a head temperature of 73–75° C. The amine weighed 1.47 g.

*b.* To a stirred mixture of 0.56 ml. of carbon disulfide and 1.0 ml. of 28% ammonium hydroxide in an ice bath was added dropwise 1.0 g. of benzofurfurylamine. After 15 minutes, the mixture was dissolved in 10 ml of water, and 2.26 g. of lead nitrate in 5 ml. of water was added. The mixture was heated for several minutes and extracted with ether. The residue from the ether solution was distilled at 2 mm. at a head temperature of 105–110° C. The isothiocyanate (0.35 g.) gave the following analytical values:

|           | Calculated, Percent | Found, Percent |
|-----------|--------------------:|---------------:|
| Carbon    | 63.5                | 63.9           |
| Hydrogen  | 3.70                | 4.10           |

EXAMPLE 3

*2-thenyl isothiocyanate*

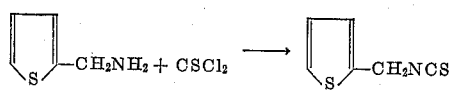

To a stirred solution of 3.3 g. of thiophosgene in 10 ml. of chloroform, was added dropwise 3.55 g. of thenylamine in 10 ml. of chloroform. The mixture was refluxed for 8 hours, and allowed to stand overnight. The mixture was filtered, and the residue from the chloroform solution was distilled at 1 mm. at 76–80° C. The distillate gave the following analytical values:

|           | Calculated, Percent | Found, Percent |
|-----------|--------------------:|---------------:|
| Carbon    | 46.5                | 45.1           |
| Hydrogen  | 3.21                | 3.21           |

EXAMPLE 4

*2-pyridylmethyl isothiocyanate*

(a)
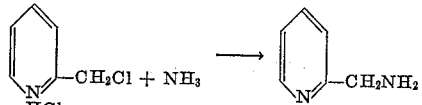

(b)
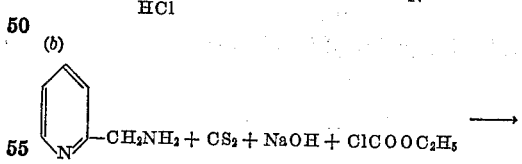

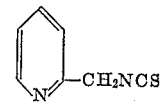

*a.* To 5.0 g. of the hydrochloride of 2-pyridylmethyl chloride was added 300 ml. of a saturated ammonia solution of ethanol. After three days, the solution was evaporated, treated with alkali, and extracted with chloroform. The residue from the chloroform solution was distilled at 10 mm. at a head temperature of 80–82° C. The distillate (amine) weighed 1.8 g.

*b.* To a stirred mixture of 1.3 g. of carbon disulfide, 0.7 g. of sodium hydroxide, and 20 ml. of water in an ice bath, was added dropwise 0.8 g. of 2-pyridylmethylamine. After one hour at room temperature, 1.8 g. of ethyl chloroformate was added dropwise to the stirred mixture which was then extracted with ether. The ether residue was distilled at 1 mm. at a head temperature of 109–110° C. The distillate weighed 0.7 g.

The following specific example is illustrative of an alternative method of preparing the compounds of this invention:

EXAMPLE 5

*2-furfuryl isothiocyanate*

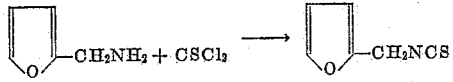

3.0 g. of furfurylamine in 10 ml. of chloroform was added dropwise at room temperature to a stirred mixture of 3.1 ml. of thiophosgene and 3.0 g. of anhydrous potassium carbonate in 20 ml. of chloroform. After refluxing for four hours, the mixture was filtered, the filtrate evaporated, and the residue was distilled at 83–86° C. at 10 mm. The yield was 0.8 g.

While in the specific examples set forth above, the substituent —RNCS is substituted on nuclear carbon atom at position 2, such substitution may also take place at position 3 in the case of five-membered heterocyclic nuclei and also at positions 3 and 4 in the case of six-membered nitrogen-containing heterocyclic nuclei. Moreover, the heterocyclic nucleus may have on nuclear carbons organic residue substituents in addition to the —RNCS substituent. Example 2 illustrates a benzene ring substituent on the heterocyclic nucleus, forming a condensed ring system. In such compounds, the substituted ring may itself carry organic residue substituents. Examples of compounds containing simple substituents on the heterocyclic nucleus are:

5-methyl-furfuryl isothiocyanate

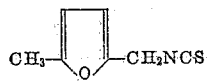

2-ethyl-4-pyridylmethyl isothiocyanate

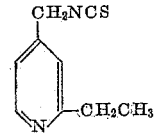

1,3,5-trimethyl-2-pyrrolemethyl isothiocyanate

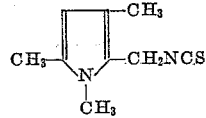

2-(2-(5-methylthienyl))ethyl isothiocyanate

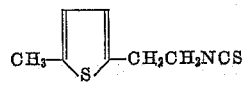

As used herein, the term "alkylene" is intended to cover both unsubstituted and substituted alkylene groups, such as, for example:

3-(2-furyl)-propyl isothiocyanate

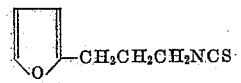

2-methyl-2-(2-thenyl)-ethyl isothiocyanate

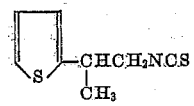

The new compounds of this invention are particularly useful as flavoring agents for foods and beverages. For example, 1 part by weight of each of the following compounds: bis-2-furfuryl disulfide; bis-(3-indolemethyl) disulfide (disclosed in our copending application Serial No. 525,354, filed of even date herewith entitled Condensed Ring Heterocyclic Disulfides); bis-(3-indolemethyl) sulfide (disclosed in our copending application Serial No. 525,353, filed of even date herewith, entitled Heterocyclic Sulfides and Their Preparation); bis-2-furfuryl sulfide (also disclosed in said copending application); 2-furfuryl isothiocyanate; 2-phenyl isothiocyanate, comprising a total of 100 mg. was dissolved in 900 mg. of a solvent such as furfuryl alcohol. Portions of this solution may be directly added to a prepared cereal-based beverage such as "Instant Postum" to enhance the flavor thereof, or similar results may be obtained by incorporating the flavoring agent during the manufacture of the cereal-based beverage concentrate, such as by adding it to the liquid material prior to the final drying step. For example, when flavoring the prepared cereal-based beverage, 12 mg. of the furfuryl alcohol solution are added to 100 cc. of beverage containing 1.5% soluble and dispersible solids. When using the furfuryl alcohol solution in the manufacture of the cereal-based beverage concentrate, about 1 oz. of the furfuryl alcohol solution is used for each 8 lbs. of the final dried product. In either case, a beverage especially acceptable to some tastes may be obtained by adjusting the pH to about 5 by the addition of citric acid or the like.

Having fully described our invention, it is to be understood that we do not wish to be limited to the details set forth, but our invention is of the full scope of the appended claim.

We claim:
2-benzofurfuryl isothiocyanate.

References Cited in the file of this patent

Braun: Liebig's Ann., vol. 445, pp. 201–24 (1925).
Brown: Can. J. Research 26D: 177–87 (C.A. 42: 7912 a and e).
Kirner et al.: J. Am. Chem. Soc., vol. 51, pp. 3131–35 (1929).